(12) United States Patent
Chern et al.

(10) Patent No.: US 6,744,560 B2
(45) Date of Patent: Jun. 1, 2004

(54) NON-LINEAR OPTICAL MATERIAL

(75) Inventors: Ming-Yau Chern, Lingchiang Rd. (TW); Keng-Shuo Wu, Taoyuan (TW); Daren Liu, Taipei Hsien (TW); Ming-Feng Shih, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 10/035,056

(22) Filed: Dec. 27, 2001

(65) Prior Publication Data

US 2003/0011886 A1 Jan. 16, 2003

(30) Foreign Application Priority Data

Jul. 13, 2001 (TW) ........................................ 90117154 A

(51) Int. Cl.⁷ .................................................. G02B 1/10
(52) U.S. Cl. ........................ 359/580; 359/582; 359/885
(58) Field of Search ................................ 359/580, 582, 359/885; 252/582

(56) References Cited

U.S. PATENT DOCUMENTS

| | | | | | |
|---|---|---|---|---|---|
| 4,510,190 | A | * | 4/1985 | Glaser | 204/192.22 |
| 5,300,487 | A | * | 4/1994 | Hed | 359/599 |
| 5,602,079 | A | * | 2/1997 | Takenaka et al. | 219/121.69 |
| 5,805,326 | A | * | 9/1998 | Snow et al. | 359/241 |
| 5,844,225 | A | * | 12/1998 | Kimock et al. | 235/462.01 |
| 6,106,948 | A | * | 8/2000 | Wang et al. | 427/162 |
| 6,264,858 | B1 | * | 7/2001 | Bohaty et al. | 252/584 |
| 6,358,392 | B1 | * | 3/2002 | Yang et al. | 205/205 |

* cited by examiner

Primary Examiner—Drew A. Dunn
Assistant Examiner—Joshua L Pritchett
(74) Attorney, Agent, or Firm—J. C. Patents

(57) ABSTRACT

A non-linear optical material comprising a bismuth film is described. When a laser beam is conducted through the bismuth film, the bismuth film exhibits strong non-linear optical effects including non-linear refraction and non-linear absorption.

10 Claims, 1 Drawing Sheet

NON-LINEAR OPTICAL MATERIAL

CROSS-REFERENCE TO RELATED APPLICATION

This application claims priority benefit of Taiwan application Serial No. 90117154, filed on Jul. 13, 2001.

BACKGROUND OF THE INVENTION

1. Field of Invention

The present invention relates to a non-linear optical material. Particularly, the present invention relates to a non-linear optical material comprising a bismuth film that exhibits strong non-linear optical effects including non-linear refraction and non-linear absorption. When an incident beam passes through the bismuth film, the refractive index and the absorption coefficient of the bismuth film change remarkably with the intensity of the incident beam.

2. Description of Related Art

The refractive index "n" and the absorption coefficient "$\alpha$" of a common optical material usually change very slightly with the intensity of an incident beam, and can be taken as two constants, $n_0$ and $\alpha_0$, respectively. Such an optical material is called a linear optical material. For a non-linear optical material, however, the refractive index n and the absorption coefficient $\alpha$ change with the intensity of the incident beam. If the variation of the refractive index n of a non-linear optical material is directly proportional to one order of the intensity I of an incident beam, which is expressed by $n=n_0+n_1 I$, the non-linear refractive effect becomes stronger as the intensity of the incident beam increases. Therefore, when a laser beam is conducted through the non-linear material, a self-focusing effect or a self-defocusing effect is produced, wherein the non-linear material acts as a convex lens or as a concave lens (See Y. R. Shen, "The Principles of Non-linear Optics", John Wiely & Sons, 1984, p. 303~331).

Moreover, if the variation of the absorption coefficient $\alpha$ of a non-linear optical material is directly proportional to one order of the intensity I of an incident beam, the absorption coefficient a can be expressed by $\alpha=\alpha_0+\alpha_1 I$.

The properties of a non-linear optical material can be easily measured by a method described by M. Sheik-Bahae et al. in IEEE. J. Quantum Electron, 26, p. 760~769 (1990). The method is called "Z-SCAN" and can be used to precisely measure the variations of the refractive index and the absorption coefficient of a non-linear optical material.

For common materials, the values of the first-order terms $n_1$ and $\alpha_1$ both are quite small. For example, the $n_1$ value of glass is $4\times10^{-7}$ cm$^2$/GW (See W. Koechner, "Solid-State Laser Engineering", Springer, 1999, p. 672), a very intense beam is thus needed to induce a non-linear refractive effect. Specifically, when the refractive index of glass is increased by only one millionth, the intensity I of the incident beam must be as high as 2.5 GW/cm$^2$. Therefore, in order to be possible to use a weaker incident beam and thereby to facilitate the applications of non-linear optical mechanisms, finding a non-linear optical material with larger $n_1$ and $\alpha_1$ values is important.

SUMMARY OF THE INVENTION

Accordingly, the present invention provides a non-linear optical material comprising a bismuth film that exhibits strong non-linear effects with the intensity of an incident beam. The bismuth film is thin enough to be semi-transparent for an incident beam and the non-linear optical effects include non-linear refraction and non-linear absorption that are mainly attributed to the bismuth film.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
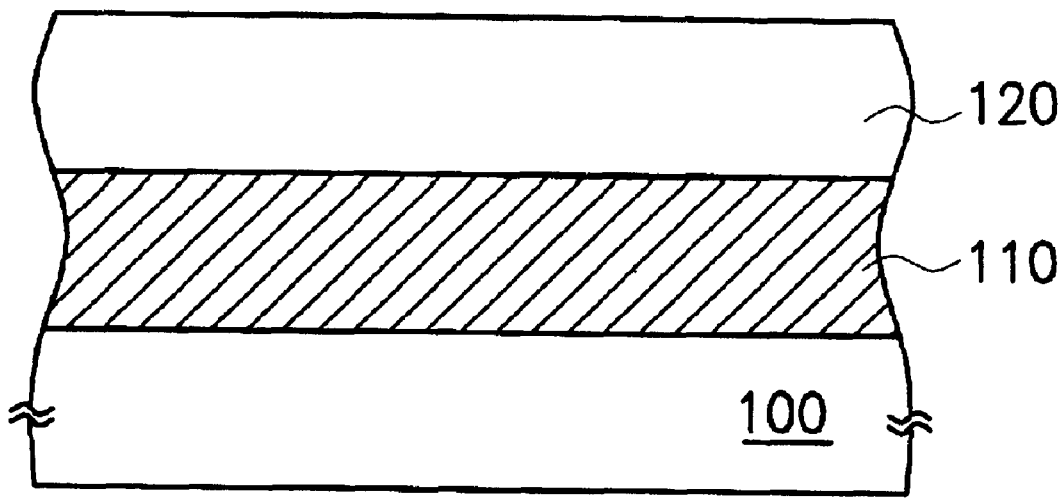
FIG. 1 illustrates the structure of a non-linear optical material according to a preferred embodiment of this invention in a cross-sectional view.

Refer to FIG. 1, the non-linear optical material according to the preferred embodiment of this invention comprises a bismuth film 110 that is located on a base layer 100 and is covered by a transparent top protective layer 120. The bismuth film 110 is responsible for producing non-linear optical effects, the top protective layer 120 is formed to protect the bismuth film 110, and the base layer 100 is used to load and protect the two layers 110 and 120. The base layer 100 comprises, for example, glass or quartz. The bismuth film 110 is fabricated by the method described below, for example.

Preparation of Bismuth Film.

In the experiment, the bismuth film 110 is grown by pulsed laser deposition under the following conditions. A KrF excimer pulsed laser with a wavelength of 248 nm and a pulse length of 23 ns is focused on a bismuth target in a chamber. The surface atoms of the bismuth target is thereby evaporated instantly and then sputtered onto a base layer opposite to the target for growing a bismuth film thereon. The distance between the target and the base layer is 45 mm, the purity of the bismuth target is 99.9997%, and the base layer comprises Corning 7059 Glass. The vacuum in the chamber is kept below $10^{-7}$ torr, the temperature is maintained at room temperature, and the energy density of the laser beam irradiating on the target is about 2.3J/cm$^2$. The repetition rate of the laser pulses is 4 s$^{-1}$ and the total number of the pulses is 80. Moreover, to protect the bismuth film, 500 pulses of $Al_2O_3$ are deposited on the bismuth film 110 to serve as a top protective layer 120. The thickness of the bismuth film 110 is 10.5 nm and that of the $Al_2O_3$ film is 14 nm from an X-ray reflectivity measurement.

Measurements of Non-linear Optical Properties

The measurements of the non-linear optical properties of the non-linear optical material in the preferred embodiment is done by a method similar to the "Z-SCAN" method mentioned before, and the measuring light source is a continuous-wave (CW) green-light laser with a wavelength of 532 nm. The measuring results are $n_1=4.83\times10^4$ cm$^2$/GW and $\alpha_1=-1.55\times10^9$ cm/GW, and the non-linear optical effects appear when the power of the laser beam is larger than 50 mW with a central intensity of $1.13\times10^{-4}$ GW/cm$^2$. By comparing with the non-linear effects of glass mentioned before ($n_1=4\times10^{-7}$ cm$^2$/GW), the non-linear optical material of this invention produces non-linear effects a million times stronger with an incident beam 1/100,000 weaker.

From the measuring results of the non-linear optical material of this invention, the following facts can be derived. Since $n_1>0$, the refractive index n of the non-linear optical material increases as the incident beam becomes more intense. Thus, when a laser beam is conducted through the non-linear optical material, a self-focusing phenomenon will occur and the non-linear optical material acts as a convex lens. Moreover, since $\alpha_1<0$, the absorption coefficient $\alpha$ decreases as the incident beam becomes more intense. In other words, when the incident beam becomes more intense, the optical material becomes more transparent.

It should be noted that this invention relates mostly to the bismuth film with non-linear optical properties, and using laser evaporation to fabricating the bismuth film is just an example. This invention is not limited to the bismuth film made by the above-mentioned procedures, but covers modifications and variations of this invention provided they fall within the scope of the following claims and their equivalents.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A non-linear optical filter comprising a filter material composed of a pure bismuth film that is sufficiently thin for producing non-linear refraction and non-linear absorption of incident light.

2. The non-linear optical filter of claim 1, wherein the pure bismuth film is formed by pulsed laser deposition.

3. The non-linear optical filter of claim 1, wherein a thickness of the pure bismuth film is approximately 10.5 nm.

4. The non-linear optical filter of claim 1, wherein the pure bismuth film is covered by a top protective layer.

5. The non-linear optical filter of claim 4, wherein the top protective layer is transparent.

6. The non-linear optical filter of claim 4, wherein the top protective layer comprises $Al_2O_3$.

7. The non-linear optical filter of claim 1, wherein the pure bismuth film is disposed on a base layer.

8. The non-linear optical filter of claim 7, wherein the base layer comprises glass.

9. The non-linear optical filter of claim 7, wherein the base layer comprises quartz.

10. The non-linear optical filter of claim 1, which is used as a non-linear optical device in an optical method or in an optical apparatus.

* * * * *